United States Patent [19]

Samokovliiski et al.

[11] Patent Number: 4,845,336
[45] Date of Patent: Jul. 4, 1989

[54] MODULAR WIRE FEEDING DEVICE

[75] Inventors: David A. Samokovliiski; Alfred E. Nemetchek; Mihail G. Gitchev; Krassimir A. Andreev; Iltcho T. Bozadjiev; Emil T. Momtchilov, all of Sofia, Bulgaria

[73] Assignee: Institute Po Technicheska Kibernetika, Sofia, Bulgaria

[21] Appl. No.: 118,575

[22] Filed: Nov. 6, 1987

Related U.S. Application Data

[63] Continuation-in-part of Ser. No. 756,360, Jul. 18, 1985, abandoned.

[51] Int. Cl.[4] .............................................. B23K 9/28
[52] U.S. Cl. ............................. 219/137.2; 219/137.62; 219/137.9
[58] Field of Search ............. 219/137.2, 137.62, 137.7, 219/137.63, 137.9

[56] References Cited

U.S. PATENT DOCUMENTS 3,098,892  8/1961  Spade .................................. 219/136
3,744,694  7/1973  Karnes ............................. 219/137.9
3,775,584  11/1973  Moerke ......................... 219/137.63

Primary Examiner—H. Broome
Assistant Examiner—Melissa C. Chiu
Attorney, Agent, or Firm—Klein & Vibber

[57] ABSTRACT

A modular wire feeding device includes a wire feeding block with an electric motor and a planetary wire feeding head disposed in an electrically insulating casing. To the front shield of the electric motor there is rigidly fastened a current and water conducting pipe, a water outlet and gas inlet pipe connected to a front and rear flange. To the rear shield of the electric motor there is mounted an insulating flange which connects the wire feeding device to the wire supply part of a welding hose. The external surfaces of the front, rear, and insulating flanges are shaped as guides of the insulating casing. The casing is made up of two parts with openings provided for the manipulation of the wire feeding head. Above the openings and movably mounted on the insulating casing there is mounted a protective cover for the openings in the casing.

12 Claims, 4 Drawing Sheets

MODULAR WIRE FEEDING DEVICE

This application is a continuation-in-part of application serial number 756,360 filed July 18, 1985 now abandoned.

The complete disclosures of the following prior U.S. Patents are incorporated herein by reference: U.S. Pat. Nos. 4,605,148 to Samokovliiski 4,429,821 to Jelezov; 4,426,046 to Heuckroth; 4,261,500 to Samokovliiski et al; 3,684,152 to Boden; and 2,861,900 to Smith et al.

BACKGROUND OF THE INVENTION

The invention relates to a modular wire feeding device for use with a welding torch. The device may be either built in into a welding torch handle or set apart in an intermediate module. The invention is particularly suited for the feeding of electrode wire over great distances under severe welding conditions and is very useful when welding in a protective gas atmosphere.

A known modular planetary type wire feeding device, disclosed in Bulgarian Author's Certificate No. 24 442 (U.S. Pat. No. 4,261,500), comprises a wire feeding block built in to a welding torch provided with a handle. The wire feeding block, comprising an electric motor and a planetary head, is mounted in a current conducting and gas supply pipe which is shaped as a handle. The gas system and the current conducting components in the handle are composed of three parts, such parts being connected by threaded joints and being embraced by and disposed inside an insulated body.

The drawbacks of this prior art device are as follows:

it has inadequate cooling; therefore, it cannot operate under severe welding conditions (above 400 amperes) or with electrode wire of great diameter;

it operates under impaired welding conditions because of the increased sticking of metal splashes on the gas supply system and the contact nozzle, and the poor commutation of the welding current;

it has a complex structure, being composed of several assembled parts by fastening joints and this results in the unreliable supply of the welding current and of the protective gas;

the device is poorly adapted to a production arrangement, and is inconvenient for the building up of a multi-modular system because of the necessity of disassembly of the various components of the working systems of the modules during service, such operations being accompanied by a torsion applied to the welding hose.

Another known wire feeding burner, which is disclosed in a catalog of the "Hulfteger Company" of Switzerland, has a water cooled handle. The wire feeding block of this device is of a conventional type, and comprises a motor, disposed in the handle, and wire feeding rolls, while the burner itself is of the "pistol" type.

A drawback of this latter known burner lies in its lack of compactness, its lack of optimum overall sizes, and its lack of relative ease of operation, as well in the impossibility of building up multi-modular combinations for feeding the electrode wire over great distances because of the conventional methods of wire feeding and the disposition of the motor transversely to the direction of travel of the wire being fed.

It is therefore the general object of this invention to provide a modular wire feeding device of simplified, technologically more suitable and compact design of less weight, which provides for an effective cooling and improved welding conditions with a good commutation of the welding current, and wider service possibilities for operation under severe welding conditions with electrode wire of great diameter, thus making it possible to build up multi-modular combinations for wire feeding over great distances without the necessity of disassembly and disconnection of its gas, water, current conducting and wire feeding systems.

SUMMARY OF THE INVENTION

The above objects are achieved by the inventive wire feeding device which has a wire-feeding block with an electric motor and a planetary wire feeding head, disposed in an insulating casing. According to the invention, a carrying current conducting coolable body is rigidly fastened to the front shield of the electric motor, said body being composed of a current carrying and water supply, a water outlet and gas inlet pipes connected to a front and a rear flange. An insulating flange is mounted to the rear shield of the electric motor and connects the wire feeding device of a welding hose. The external surfaces of the front, rear, and insulating flanges are shaped as guides of the insulating casing. The insulating casing is made up of two parts with openings provided for manipulations upon the wire feeding head. Above the openings and movably disposed on the insulating casing there is mounted a protective cover.

The modular wire feeding device in accordance with the invention can be constructed in two variants: (1) as a welding torch, and (2) as an intermediate module.

In variant (1), wherein the modular wire feeding device is constructed as a welding torch with a handle, to the external side of the front flange there is directly fastened an outlet wire feeding nozzle, and there are rigidly attached current carrying and water carrying means as well as a water outlet, a gas inlet, and wire feeding pipes which end at the front part of the welding torch.

In the variant (2), wherein the modular wire feeding device is constructed as an intermediate module, to the internal side of the front flange, which is a collector, there are rigidly fastened an intermediate insulating flange having an outlet wire feeding nozzle movably attached to it, a current carrying and a water carrying threaded joint, water outlet and gas inlet coupling tips for the intermediate welding hose.

In both variants (1) and (2), the rear flange is a heat radiator, and to it there is attached the wire feeding block, which is insulated therefrom, while the free space between insulating casing and the integral current carrying coolable body is cooled by the combined cooling effects of the cooling water and of the protective gas passing directly through it.

The advantages of the devices (1) and (2) in accordance with the invention lie in:

easily realizable possibility of incorporating the device in multi-modular systems for the feeding of electrode wire over great distances (of up to 60 meters and more) under severe welding conditions (above 400 amperes) with electrode wires of great diameters;

considerably improved welding conditions which such devices provide, i.e. the increased life of the contact and gas nozzle, as well as the improved commutation of the welding current as a result of the maximum effect of the combined cooling action which they achieve;

reduced weight of the devices per unit of welding current;

reliable supply of welding current, protective gas, and cooling water because of the lack of fastening connections;

increased versatility for operation with all diameters and types of welding wire without the necessity of disassembly of the burner or of the intermediate module, and without disturbing the current supply and the tightness of the cooling system and of the gas system;

high work producing characteristics of devices (1) and (2) with regard to overall dimensions, mass, and convenience of operation.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
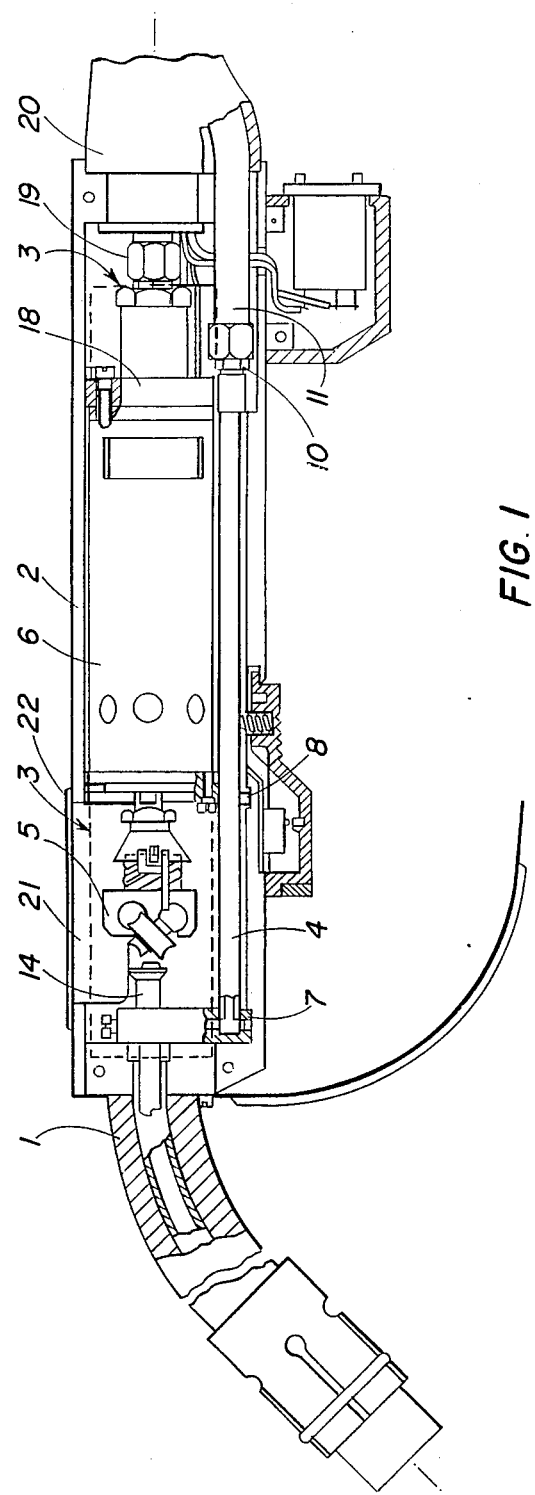
FIG. 1 shows a first embodiment of the invention, such embodiment having a modular wire feeding device constructed as a torch with a handle, the view being partially in side elevation and partially in longitudinal axial section.
Figure 2:
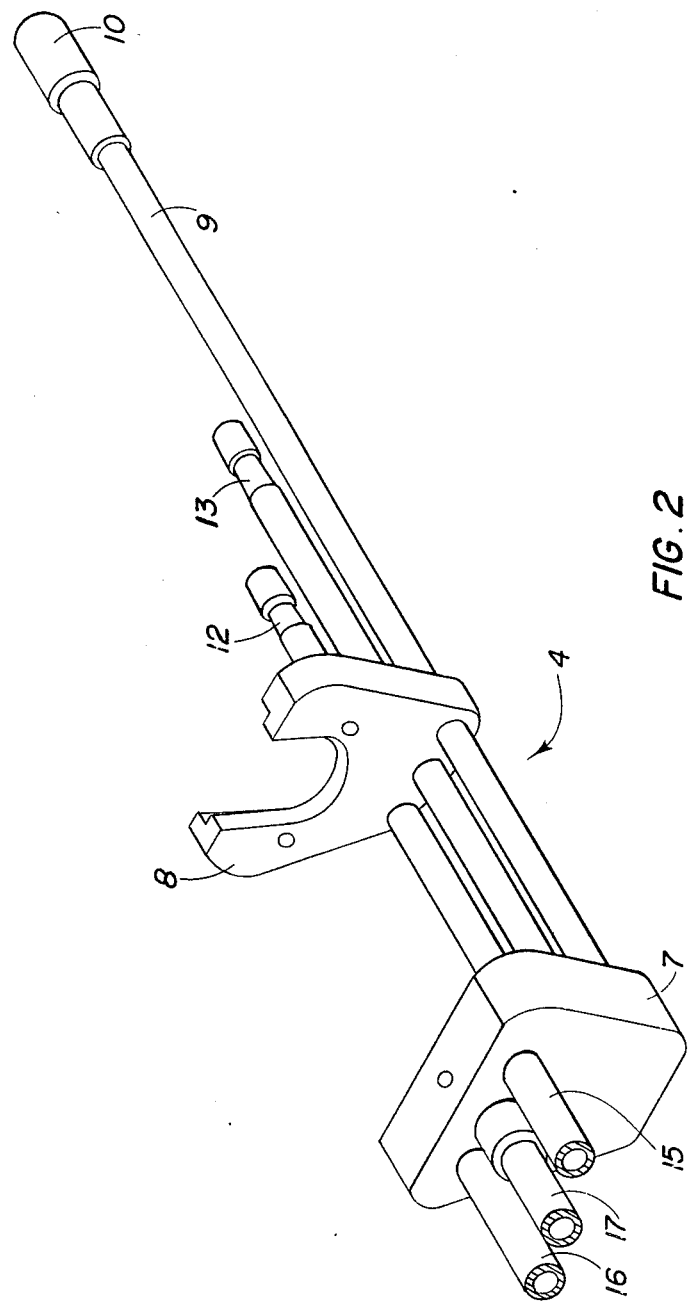
FIG. 2 is an axonometric illustration of the integral current conducting coolable body of the torch in the embodiment of FIG. 1.

Turning first to the embodiment of FIGS. 1 and 2, the modular wire feeding device is constructed as a welding torch 1 with an insulating casing 2, shaped externally as a handle, in which there are built in: a wire feeding block 3 and an integral current conducting coolable body 4. The wire feeding block 3 comprises a planetary wire feeding head 5 and an electric motor 6, on the front shield of which there is mounted the integral current conducting cooling body 4. The body 4 itself consists of a front flange 7, a rear flange 8, a current and water supply pipe 9 with a threaded connection 10 for a water cooled welding cable 11, a water outlet pipe 12, and a gas inlet pipe 13.

The welding current is fed through a bare copper cable placed in a plastic pipe or hose 11 (the "welding cable") with the cooling water flowing therein. Welding cable 11 is part of the welding hose 20 which also carries the welding wire and protective gas and a return flow of water to a water cooler. The copper cable ends with a metallic hollow shoe connected through a threaded bushing 10 to a metallic pipe 9 (FIG. 2), the latter conducting the current and the cooling water to the end of the torch 1, thus cooling those elements that are close to the welding arc.

The water thus serves for cooling the welding cable 11 and the torch 1, thus reducing the cross section and lightening the cable 11 conducting the welding current. The water serves also for cooling the torch 1 during the process of welding which makes it possible to work at high welding regimes (high amperage), as well as improve the welding current communication.

The front flange 7 of body 4 is a collector which "collects" pipes 9, 12, and 13, then transports the fluid through the corresponding openings and through outlet pipes 15, 16, and 17 carries the fluid further on. Flange 7 is provided on its internal side with a hole for the removable attachment of a wire feeding nozzle 14. On its external side, there are soldered a front current and water supply pipe 15, a front water outlet pipe 16, and a gas-inlet and wire-feeding pipe 17, all of which end in the front end of the welding torch 1.

The rear flange 8 is a heat radiator, and the wire-feeding block 3 is attached to it. To the rear shield of the electric motor 6 there is mounted an insulation flange 18 for the attachment of the wire feeding part 19 of the welding hose 20. The motor 6 is powered through built-in wires that also come from the hose 20.

As can be seen from the drawing, the pipes 9, 12, and 13 are arranged circumferentially relative to the axis of the device and the axis of the wire being fed through the device. Thus the front flange 7 of the first variant also serves to channel the pipes in from the circumference to a more appropriate position as shown in FIG. 2, e.g. by arranging the gas supply coaxial with the wire feeding in pipe 17.

The water contacts the whole body 3 (FIG. 2) through pipes 9, 12, 15 and 16, and is isolated from the protective gas tract which consists of pipes 13 and 17 and special openings in front flange 7.

Pipe 17 is a pipe that feeds to the welding torch 1: welding wire which comes from hose 20 via part 19 through the feeding block 3 and shielding gas which also comes from hose 20 via pipe 13.

The radiator flange 8 (FIG. 2) receives through its mass and surface the heat obtained as a result of the work of the motor 6 and transmits it through the water return pipe 12 to a cooler. The radiator flange 8 also mechanically fixes pipes 9, 12, and 13. (FIG. 2)

Insulating flange 18 insulates the motor 6 from the wire feeding tract to prevent current communication before the contact nozzle.

The insulating casing 2 is made-up of two parts with openings 21, through its side wall openings 21 being located in the zones of the planetary wire-feeding head 5 and being selectively closed by a sliding protective cover 22.

In the device (1) of FIGS. 1 and 2, welding current is supplied by a threaded connection 10 for the current and water conducting pipe 9 and via the integral current conducting coolable body 4 toward the end of the welding torch 1 to the zone of the arc. The welding wire is fed to the insulating flange 18, passes through the wire feeding block 3, the outlet wire feeding nozzle 14, which is movably mounted in the front flange 7, and through the end of the welding torch 1 from which it is fed to the zone of the welding arc.

The mode of operation of the modular wire feeding device of the first variant (constructed as a torch with a handle) is as follows:

Cold cooling water is supplied via the threaded connection 10 and the current and water conducting pipe 9 towards the front flange 7. The water cools the integral current conducting coolable body 4 and the partially used (heated) water flows through the front current and water supply pipe 15 towards the end of the welding torch 1, cools it and returns via the front water outlet pipe 16 towards the welding hose 20 which can carry the water on to a recirculation/cooling unit. When the cold cooling water flows through the integral current conducting coolable body 4, the insulating casing 2 and the space therein, including the motor 6 is cooled as well. This cooling is complemented by the flow of the protective gas through the gas supply pipe 13, the front flange 7 and the gas supply and wire feeding pipe 17.

Figure 3:
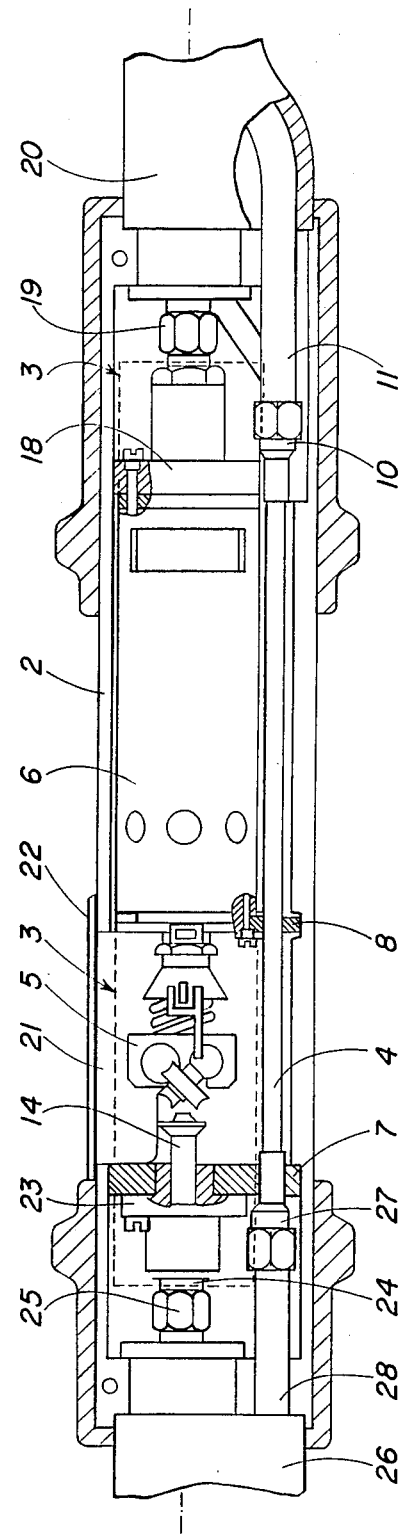
FIG. 3 is a view partially in side elevation and partially in longitudinal axial section of a second embodiment of the device of the invention, the figure showing a modular wire feeding device constructed as an intermediate module.
Figure 4:
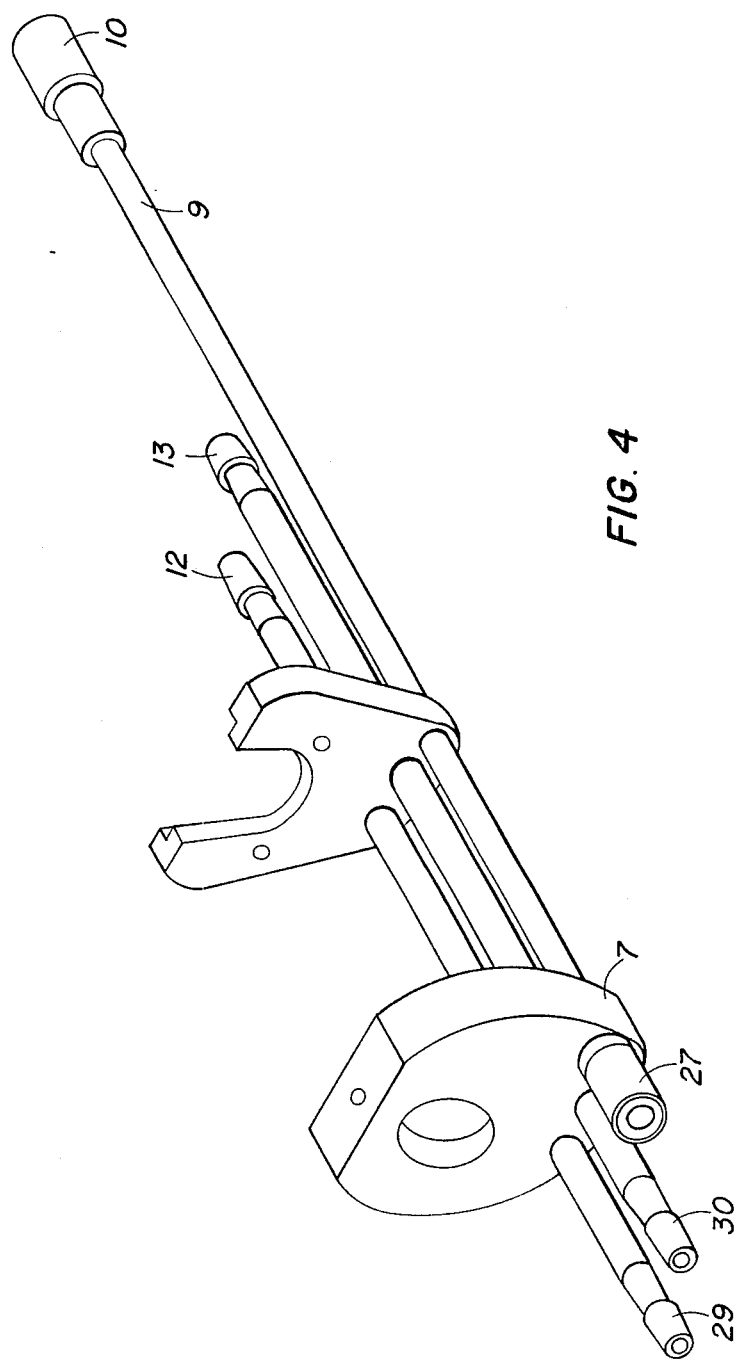
FIG. 4 is a view in axonometric projection of the integral current conducting coolable body of the module of the device shown in FIG. 3.

Turning now to FIGS. 3 and 4, which show variant (2), i.e. the modular wire-feeding device constructed as an intermediate module. Variant (2) is made up of essentially the same components as variant (1) above, with the difference that on the external side of the front flange 7 there are rigidly fastened the following members: an intermediate insulating flange 23 with an opening for the movable fastening of the outlet wire feeding nozzle 14, and an intermediate threaded connection 24 for a second a wire feeding part 25 (similar to 19) of an intermediate welding hose 26 (similar to 20); a current and water conducting threaded connection 27 to an intermediate welding cable 28 (similar to 11); a water outlet coupling tip 29 (similar to 16), and a gas-inlet coupling tip 30 (similar to 17, but conducting gas only).

The mode of operation of the water and gas systems of the modular wire-feeding device (variant 2) constructed as an intermediate module is similar to that of the above described device (variant 1), the only difference being that the cooling and protective gas flows, after the front flange 7, through the current and water conducting threaded connection 27 and the gas inlet coupling tip 30, respectively, toward to the intermediate welding hose 26, while the used water is returned by the water-outlet coupling tip 29. The modular device of variant 2 may, of course, be arranged in series with other similar or identical modular devices.

In both variants (1) and (2) of the modular wire-feeding device all flanges of the integral current conducting coolable body 4 are shaped as guides of the insulating casing 2.

The described water and gas systems remove the heat from the welding arc generated under severe welding conditions with electrode wire of great diameter, thus effecting an efficient cooling of the whole combination of modular devices, while the active reduction of temperature in the end of the torch 1 makes the sticking of metal splashes to the devices negligible.

In the modular device (variant 2) of FIGS. 3 and 4, the welding current is supplied to the integral current-conducting coolable body 4 in a manner similar to that in variant (1), and then it is transmitted to the intermediate welding cable 28 via the current and water conducting threaded connection 27, while the welding wire is fed after the outlet wire feeding nozzle 14, mounted movably in the intermediate insulating flange 23, through the intermediate threaded connection 24 to a second wire-feeding part 25 of the intermediate welding hose 26.

The passing through of a new electrode wire or its replacement by a combination of more than one modular device is effected unhindered consecutively via the intermediate welding hoses 26 of all modular devices up to torch 1; the respective wire feeding heads 5 are opened for the necessary manipulations by pulling the protective covers 22 without interrupting the integrity and tightness of the gas, water, and current, conducting systems.

The present invention therefore provides a true compact multimodular (more than two intermediate modules) water-coolable device carrying four main conduits (gas, water, wire, and current) of the multimodular wire-feeding system disposed in line with the welding hose.

The above features lead to a minimizing of dimensions and weight of the wire-feeding system. This disposition of the multimodular wire-feeding system gives a real possibility of welding at forced regimes (high amperages from 400 to 500 A), and welding at great distance (over 50 m), while it preserves portability and handiness.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A modular wire feeding device for the feeding of arc welding electrode wire from a welding hose having a wire feeding section, a gas supply section, and a current and water supply section, said wire feeding device comprising an electrically insulating casing;

a wire-feeding block with an electric motor and a planetary wire-feeding head, all built into said electrically insulating casing;

said electric motor having a front shield and a rear shield;

an integral current conducting coolable body fastened to the front shield of the electric motor;

said coolable body comprising a front flange and a rear flange, a current and water conducting pipe, a water outlet pipe and a gas supply pipe, said pipes being connected to said front flange and said rear flange; and an insulating flange mounted on the rear shield of the electric motor which connects the wire feeding section of a welding hose.

2. A modular wire feeding device as claimed in claim 1, wherein external surfaces of the front flange, the rear flange, and the insulating flange are shaped as guides of the insulating casing, said insulating casing being made in two parts.

3. A modular wire feeding device according to claim 1, wherein the insulating casing is provided with openings for the manipulation of the wire feeding head, and above the openings in the casing and movable thereon there is mounted a protective cover.

4. A modular wire feeding device according to claim 1, wherein the front flange is a collector with a wire feeding outlet nozzle movably attached to it, the rear flange is a heat radiator, and the wire feeding block is fastened to and electrically insulated from the rear flange.

5. A modular wire feeding device according to claim 4, further comprising an intermediate insulating flange, said wire feeding outlet nozzle being removably attached to said intermediate insulating flange, said intermediate insulating flange being rigidly fastened to the external side of said front flange;

a current and water conducting threaded connection, rigidly fastened to the external side of said front flange;

a water outlet coupling, rigidly fastened to the external side of said front flange; and a gas outlet coupling tip, rigidly fastened to the external side of said front flange;

whereby said mudular wire feeding device couples said wire feeding section, gas supply section, and current and water supply section of said welding hose to a wire feeding section, gas supply section, and current and water supply section of an intermediate welding hose.

6. A modular wire feeding device according to claim 4, further comprising a welding torch;

a current and water supply pipe, rigidly fastened to the external side of said front flange;

a water supply pipe, rigidly fastened to the external side of said front flange; and a coaxial gas inlet and wire feeding pipe, rigidly fastened to the external side of said front flange;

whereby said modular wire feeding device couples said welding hose to said torch, supplys current to said torch, feeds wire and gas to said torch and cools said torch.

7. A modular wire feeding device for the feeding of arc welding electrode wire from a welding hose having a wire feeding section, a gas supply section, and a current and water supply section, said wire feeding device comprising an electrically insulating casing;

a wire-feeding block with an electric motor and a planetary wire-feeding head, all built into said electrically insulating casing;

said electric motor having a front shield and a rear shield;

an integral current conducting coolable body fastened to the front shield of the electric motor;

said coolable body comprising a front flange and a rear flange, a current and water conducting pipe, a water outlet pipe and a gas supply pipe, said pipes being connected to said front flange and said rear flange and arranged circumferentially relative to the axis of the wire fed by the wire feeding block, said wire-feeding head being located between said front and rear flanges; and an insulating flange mounted on the rear shield of the electric motor which connects the wire feeding section of a welding hose.

8. A modular wire feeding device as claimed in claim 7, wherein external surfaces of the front flange, the rear flange, and the insulating flange are shaped as guides of the insulating casing, said insulating casing being made in two parts.

9. A modular wire feeding device according to claim 7, wherein the insulating casing is provided with openings in the vicinity of the wire feeding head for the manipulation of the wire feeding head to accept wires of different diameter, and above the openings in the casing and movable thereon there is mounted a protective cover.

10. A modular wire feeding device according to claim 7, wherein the front flange is a collector with a wire feeding outlet nozzle movably attached to it, the rear flange is a heat radiator, and the wire feeding block is fastened to and electrically insulated from the rear flange.

11. A modular wire feeding device according to claim 10, further comprising an intermediate insulating flange, said wire feeding outlet nozzle being removably attached to said intermediate insulating flange, said intermediate insulating flange being rigidly fastened to the external side of said front flange;

a current and water conducting threaded connection, rigidly fastened to the external side of said front flange;

a water outlet coupling, rigidly fastened to the external side of said front flange; and a gas outlet coupling tip, rigidly fastened to the external side of said front flange;

whereby said modular wire feeding device couples said wire feeding section, gas supply section, and current and water supply section of said welding hose to a wire feeding section, gas supply section, and current and water supply section of an intermediate welding hose.

12. A modular wire feeding device according to claim 10, further comprising a welding torch;

a current and water supply pipe, rigidly fastened to the external side of said front flange;

a water supply pipe, rigidly fastened to the external side of said front flange; and a coaxial gas inlet and wire feeding pipe, rigidly fastened to the external side of said front flange;

whereby said modular wire feeding device couples said welding hose to said torch, supplies current to said torch, feeds wire and gas to said torch and cools said torch.

* * * * *